United States Patent [19]

Shell et al.

[11] Patent Number: 5,540,213
[45] Date of Patent: Jul. 30, 1996

[54] PORTABLE KEROSENE HEATER

[75] Inventors: Dennis B. Shell, Webster; Jay J. Kakuk, Plymouth, both of Minn.

[73] Assignee: DESA International, Bowling Green, Ky.

[21] Appl. No.: 228,325

[22] Filed: Apr. 15, 1994

[51] Int. Cl.$^6$ ........................................ F24H 3/02
[52] U.S. Cl. ........................ 126/110 B; 126/110 C; 126/110 D; 126/109; 431/11; 431/168; 431/171; 431/350; 431/353; 431/328
[58] Field of Search ................. 431/11, 168, 169, 431/350, 353, 171, 8, 347, 348, 326, 328; 126/110 B, 110 C, 110 D, 104 R, 104 A, 109, 110 R

[56] References Cited

U.S. PATENT DOCUMENTS

| | | | |
|---|---|---|---|
| 460,054 | 9/1891 | Rhind . | |
| 2,227,195 | 12/1940 | Moule . | |
| 2,396,306 | 3/1946 | von Hasse . | |
| 2,421,370 | 6/1947 | Budlane | 126/110 |
| 4,095,933 | 6/1978 | Schumacher | 431/11 |
| 4,113,425 | 9/1978 | von Linde et al. | 431/352 |
| 4,298,335 | 11/1981 | Riordan et al. | 431/25 |
| 4,309,978 | 1/1982 | Hensick et al. | 126/110 B |
| 4,848,313 | 7/1989 | Velie | 126/110 B X |
| 4,963,089 | 10/1990 | Spielman | 431/351 |
| 4,998,878 | 3/1991 | Gruber | 431/90 |
| 5,203,689 | 4/1993 | Duggan et al. | 431/328 X |
| 5,226,783 | 7/1993 | Mita | 416/223 R |
| 5,236,350 | 8/1993 | Cummings, III et al. | 431/173 |
| 5,249,956 | 10/1993 | Chu | 126/110 B |

FOREIGN PATENT DOCUMENTS

| | | | |
|---|---|---|---|
| 0044514 | 4/1981 | Japan | 431/169 |
| 0092607 | 6/1982 | Japan | 431/208 |

*Primary Examiner*—Carl D. Price
*Attorney, Agent, or Firm*—Jones, Day, Reavis & Pogue

[57] ABSTRACT

A kerosene heater (1) having a pump assembly (106) which includes a piston (113) having a hollow bore (121) through which fuel (98) is routed to the hollow shaft of a fuel atomizer (27). The piston (113) is operated by a cam (117) machined into the shaft (114) of the heater motor (22). Mounted on the motor shaft (114) between the atomizer (27) and the pump assembly (106) is a novel fan (26) combining both low pitched outer blade portions (143) and high pitched vanes (146) near the hub (136) of the fan (26). The air flow near the periphery of the fan tends to be axial while the flow near the hub (136) tends to be turbulent and of lower velocity. A series of rear heads (32,33) downstream of the atomizer (27) tends to separate cooling and combustion air while preheating a portion of the air in the region of the atomizer (27). Some of the air impinges a serrated disc (47) located downstream of the atomizer (27), the disc having a novel edge structure (49) which tends to create turbulence and aid atomization of the fuel prior to ignition. A pair of tapering, nesting perforated cones (65,81) located downstream of the ignitor (17) modify the fuel/air mixture and control the size and shape of the flame as it moves toward the open end (179) of the heater jacket (10). A novel control circuit (162) measures the resistance of the ignitor (17) to obtain an indication of the temperature within the combustion chamber and generate motor control signals in response thereto.

19 Claims, 9 Drawing Sheets

PORTABLE KEROSENE HEATER

BACKGROUND OF THE INVENTION

1. Field of the Invention

This invention relates generally to forced air heaters and in particular to fired heaters intended for portable use.

2. Description of Related Technology

The prior art includes a variety of air heaters suitable for heating portable shelters, garages and the like. As shown in U.S. Pat. No. 2,421,370, such air heaters generally include an outer casing, a smaller drum enclosing a combustion chamber positioned within the casing to define a plurality of air heating passages extending through the heater between the periphery of the drum and the casing, and a fan secured at one end of the casing suitable for forcing venting air through the heating passages. A fuel burner is positioned at the upstream end of the drum to accommodate the delivery of an axially directed flame into the combustion chamber toward its downstream end where the resulting combustion gases are evacuated frown the chamber. When this type of burner is put into operation, the peripheral region of the combustion chamber surrounding the burner is relatively cool compared to its downstream end where the temperature within the chamber is generally in excess of 1100° Celsius.

Due to this temperature differential along the length of tile combustion drum, only seventy percent of the drum's surface area is effectively utilized to heat the air moving through the casing. In order to obtain greater heat transfer from the drum to the venting air moving through the air heating passages, a series of vanes or baffles is provided at the downstream end of the drum to increase the radiant surface area exposed to the venting air flow about the periphery of the drum, or to provide a relatively large number of smaller heating passages. The solution of such three dimensional fluid flow and heat transfer problems is an inexact science, and the approaches just described have heretofore resulted in a substantial pressure drop in air flowing through the heater as well as being relatively difficult to fabricate and repair. Also, depending on the type of fuel used, such arrangements make complete combustion of the fuel difficult. As a result, carbon tends to build up on the walls of the combustion chamber, which in turn leads to corrosion and pitting in the walls, ultimately rendering the drum unserviceable.

Attempts have been made to eliminate the vanes and baffles required at the downstream end of the drum to obtain sufficient heat transfer and eliminate the associated pressure drop brought about by such vanes and baffles. In U.S. Pat. No. 4,309,978 a portable heater structure was disclosed which reversed tile combustion gas flow at the downstream end of the combustion drum to form a flow of hot combustion gases moving towards discharge ports at the upstream end of the combustion drum, thus more effectively utilizing the entire length of tile heater for heat exchange purposes and obtaining complete combustion without corrosive carbon deposits within the drum. In order to accomplish this and at the same time support the combustion drum within the outer casing, a particular type of ribbed drum was provided with the ribs abutting the casing and sometimes leading to hot spots at the areas of abutment, gathering particulate material and interfering with heat exchange flow. Further, the manufacturing and assembly steps required were often extensive, complex and hardly economical.

One recurrent theme in previous attempts to mix fuel and air within the combustion chamber, while also controlling flame parameters such as shape, size and location within the chamber, has been the use of a conical, perforated plate. An early example of such a plate is disclosed in U.S. Pat. No. 460,054 which discloses two concentric truncated "thimbles" having perforated walls. A single truncated cone mounted concentrically within a perforated cylinder is disclosed in U.S. Pat. No. 4,095,933. Two truncated cones, joined at their bases and mounted in series, are disclosed in U.S. Pat. No. 4,113,425. A single truncated cone is disclosed in U.S. Pat. No. 4,963,089, the smaller diameter of the truncated cone being oriented toward the upstream end of the combustion chamber. The proper and definitive use of conical baffling, including shape, wall perforation patterns, cone orientation, number of cones, and cone placement is not disclosed in these aforementioned references, which instead rely on empirical or unarticulated rules of implementation.

Prior to the introduction of fuel to the combustion chamber, the fuel is typically distributed and atomized in order to promote thorough combustion. For example, U.S. Pat. No. 2,396,306 discloses the use of a fuel pipeline which enters a continuously rotating head, or "slinger," thereby throwing fuel in a radially outward direction. A disc mounted coaxially with the fuel distribution head rotates at the same rate. Fan blades mounted to the disc tend to atomize the fuel as it exits the rotating head. U.S. Pat. No. 2,227,195 discloses a radially displaced "vaporizing ring" extending along the inner peripheral edge of the combustion chamber. The ring is formed as a series of tapering serrations which tend to break up the fuel upon physical impact therewith. U.S. Pat. No. 5,236,350 discloses a rotating fuel distribution nozzle in which a pair of fuel jets is routed into each of a series of outwardly oriented channels which sling fuel into the combustion chamber. Each of these references illustrate the complexity and uncertainty which characterize prior art fuel atomization efforts.

Typically, portable kerosene heaters of the type embodied in the present invention are mounted on a trailer or chassis which also serves, at least in pan, as the fuel tank. The fuel tank is therefore below the fuel distribution, ignitor and combustion areas of the heater. Some means must be provided for elevating the fuel into the region of the ignitor, as well as atomizing and metering the fuel to the ignitor in controlled amounts. An example of such a burner is disclosed in U.S. Pat. No. 4,998,878, which utilizes, in addition to other components a fuel delivery system having a discrete fuel filter, fuel pump, solenoid valve, nozzle, fuel control valve, shutter control valve, needle valve, fuel inlet and outlet lines and apertures, and additionally, a fuel flow control system further including, among other components a piston, piston rod, shutter plate, actuator bar and actuator rod. The complexity of such an arrangement is expensive and prone to failure and misadjustment.

Other components of a portable kerosene heater include a fan upstream of the fuel slinger and ignitor, the fan tending to direct the fuel toward the ignitor, and once ignited, to urge the flame downstream through tile combustion chamber. An example of such an axial flow fan is disclosed in U.S. Pat. No. 5,226,783, which utilizes a plurality of "centrifugal elements" to inhibit countercurrent and circulation flow. The airstream lines disclosed achieve a particular result, but are not suitable for use in a burner application insofar as the requirements of a smaller hub and airflow in the region of the fuel nozzle and ignitor are not addressed.

A final feature present in prior art fuel burners is a safety device to insure that the ignitor is deactivated when tile flame is extinguished for any reason. An example of such a device is disclosed in U.S. Pat. No. 4,298,335, which includes a start up circuit, heater timer, coupling circuit, valve control circuit and a flame sensing circuit which relies on rectification of current by tile flame itself. The complexity of this arrangement is expensive and relies on the presence of a flame, rather than the sensing of the relevant combustion temperature, to control its operation.

SUMMARY OF THE INVENTION

The present invention addresses some of the aforementioned shortcomings of prior art kerosene heaters by reducing the number and complexity of components and thereby increasing overall efficiency. In particular, a pair of nesting, perforated cones reside within the combustion chamber such that their widest opening is oriented upstream and at least one is adjacent to the ignitor. The novel cone arrangement controls flame size and promotes complete combustion by mixing fuel and air at a relatively early upstream location. Also, the environmental temperature of burning is increased insofar as the region between the two cones is very hot, the cones serving to reradiate such heat into the fuel/air slipstream.

Additionally, the present invention includes a novel fuel atomizer which delivers fuel into the airstream through a spinning tube which is capable of delivering fuel through either one or both of two diametrically opposed paths.

The present invention includes a novel hot surface ignitor arrangement which ignites the fuel upon start-up. Placement of the ignitor is out of the direct fuel path and thereby tends to avoid the accumulation of carbon deposits. The ignitor is permitted to heat up for approximately fifteen seconds at a power consumption of several hundred watts prior to the initiation of fuel flow, and has a total power consumption of a very low wattage after the ignition sequence is completed.

A novel piston pump draws fuel from the tank located below the heater, the pump being activated by a cam or vane located on a rotating shaft. The fuel is delivered through two check valves at a rate of approximately one gallon per hour to a jacket or space surrounding the motor shaft for further delivery to the spinning fuel atomizer. The flow rate is adjustable by means of altering the effective stroke of the piston. This adjustment is accomplished by rotating the piston cylinder within a threaded housing, thereby increasing or decreasing its effective travel.

A novel rear head incorporates a dual wall construction and air dam. The dual wall construction increases combustion temperature by insulating the combustion chamber liner from the cold outside cooling air. The air dam creates a reverse direction air flow between the chamber liner and rear heat shield. This air flow preheats combustion air to facilitate complete combustion.

Another unique feature of the present invention is a serrated disc located downstream of the rotary fuel atomizer and upstream of the ignitor. The disc eliminates undesirable layering of the fuel and air by creating a swirling, turbulent motion within the incoming fuel/air stream.

The axial airstream is generated by a dual pitch fan having a fine, or small pitch near its perimeter in order to deliver cooling air to the outer portion of the combustion chamber. The inner more steeply pitched portion of the fan blade delivers turbulent combustion air to the combustion chamber.

Control of the heater functions is based in part on the properties of the hot surface ignitor, which changes resistance with temperature. As the temperature of the ignitor increases, its resistance decreases. After the ignitor is initially activated in order to start the flame, the ignitor is turned off and its resistance is monitored. The ignitor is located in or near the heater flame to insure that it remains well above ambient temperature when the flame is present. The ignitor is also mounted such that it is within sufficient airflow so as to cool rapidly in the event that the flame goes out. When the ignitor cools, its resistance will increase. When the resistance reaches a predetermined level, a control circuit turns the heater off to insure that fuel is not delivered if the flame is extinguished.

A preferred embodiment of the invention will now be described by way of an example which refers to the accompanying drawings, in which like reference numerals refer to like elements in the several views.

DESCRIPTION OF THE PREFERRED EMBODIMENT

Figure 1:
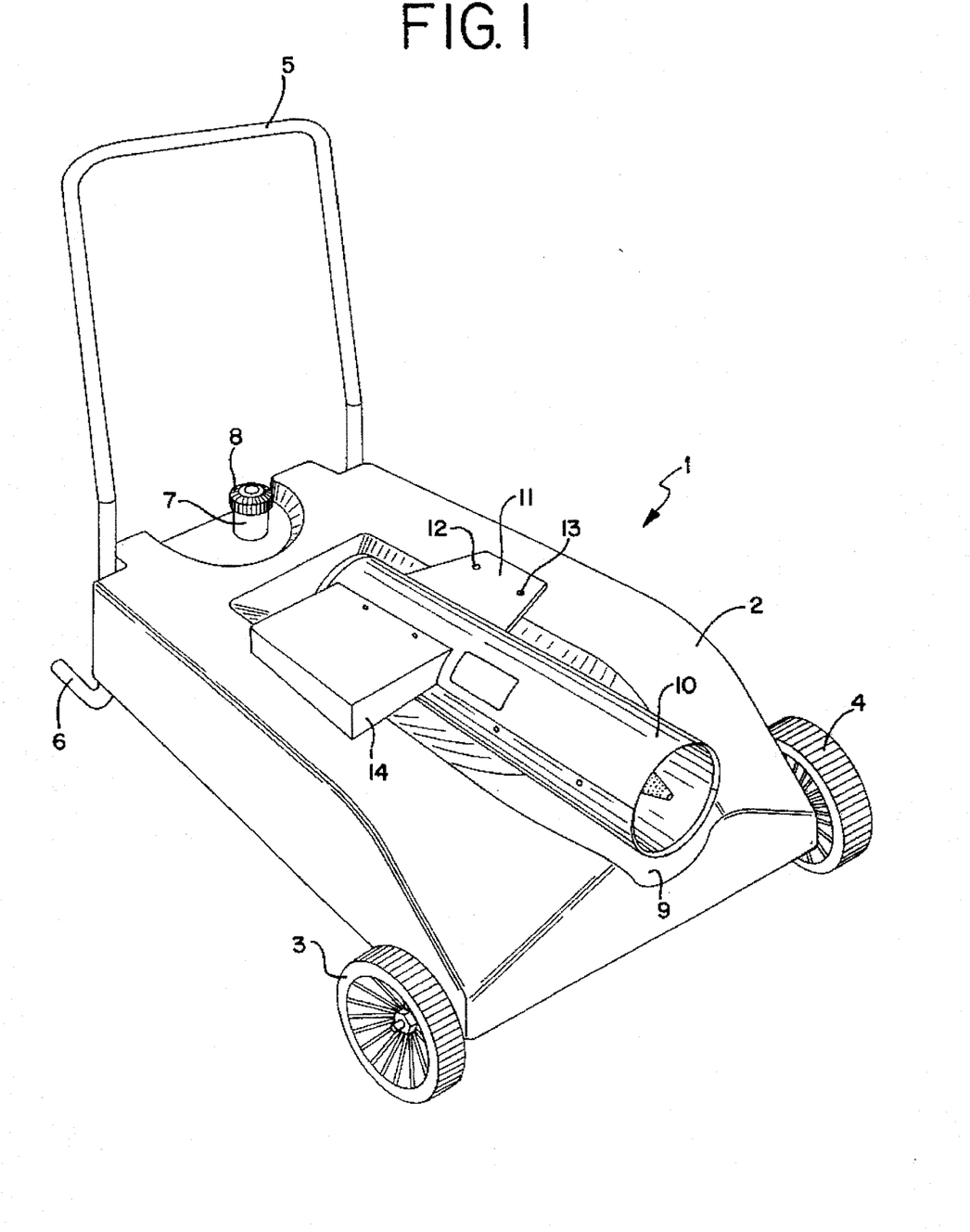
FIG. 1 is a perspective view of the exterior of a heater constructed according to the principles of the present invention.

Referring to FIG. 1, a kerosene heater 1 which is constructed according to the principles of the present invention is illustrated. The heater includes a plastic or metal base 2 which is substantially hollow and also serves as the fuel tank. Fuel is loaded into tank 5 via filler neck 7 which can be sealed by cap 8. Affixed coaxially to the forward region of the base 2 are a pair of wheels 3 and 4. The wheels 3 and 4 are mounted to axle 19 and secured by nuts 20 and 21, respectively. A handle 5 is attached to the rear portion of base 2, the handle being formed to include a foot portion 6 which serves to stabilize the entire heater assembly 1 when the heater is in use. When not in use, the heater 1 can be conveniently moved by lifting handle 5 and rolling the base 2 on wheels 3 and 4. The tank or base 2 is formed to include a channel 9 in which the heater jacket 10 resides. The heater jacket 10 is rigidly fastened to the base 2 by means of mounting flange 11 and bolts 12 and 13.

Figure 2:
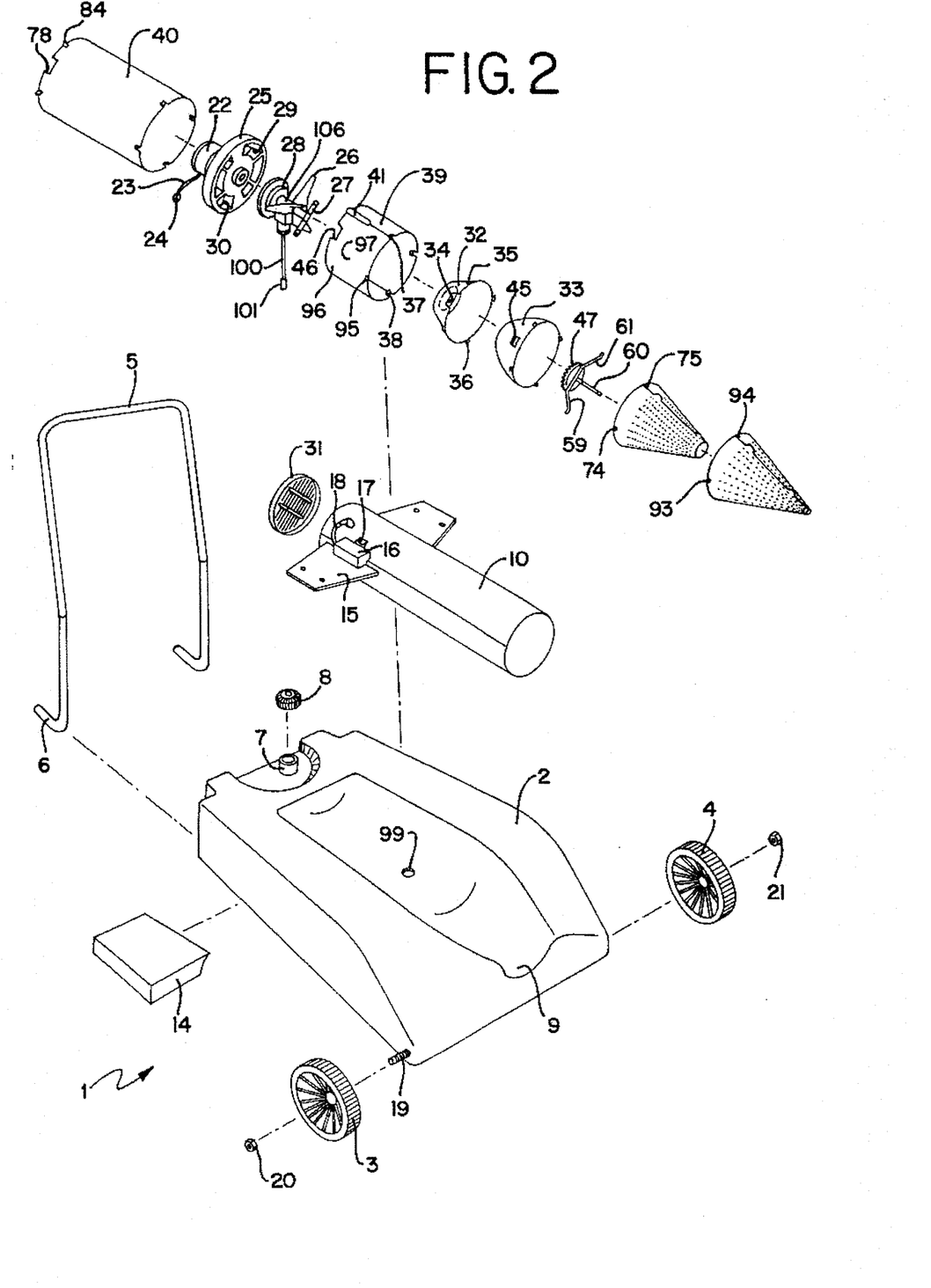
FIG. 2 is an exploded view of the heater depicted in FIG. 1.

Referring also to FIG. 2, a protective cover 14 covers an opposite mounting flange 15 and control box 16, as well as ignitor 17 and ignition lead 18. Within the heater jacket 10 is a combustion chamber fining 40, which includes an opening 78 to permit access of the ignitor 17 to the interior of the region surrounded by heater jacket 10. The lining 40 is affixed to the jacket 10 by tabs 84, 85, 80 and 79. Displaced somewhat upstream of lining 40 is motor 22. Motor 22 is connected to a suitable source of power within control box 16 by means of lead 23 which terminates at plug 24. The motor 22 is rigidly affixed to motor mounting plate 25, which is itself rigidly fastened to heater jacket 10. The motor shaft 114 (see FIG. 5) passes through motor mounting plate 25 to a fan 26 and fuel atomizer 27. The fan 26 and atomizer 27 are both affixed to the shaft 114 which is supported by bearing housing 28, the bearing housing 28 is integral with mounting plate 25. The motor mounting plate 25 is formed to include a plurality of openings, such as apertures 29 and 30, which permit air to be drawn through grate 31 and into heater jacket 10 so as to be propelled by fan 26 into the region of fuel atomizer 27 and beyond.

Figure 3:
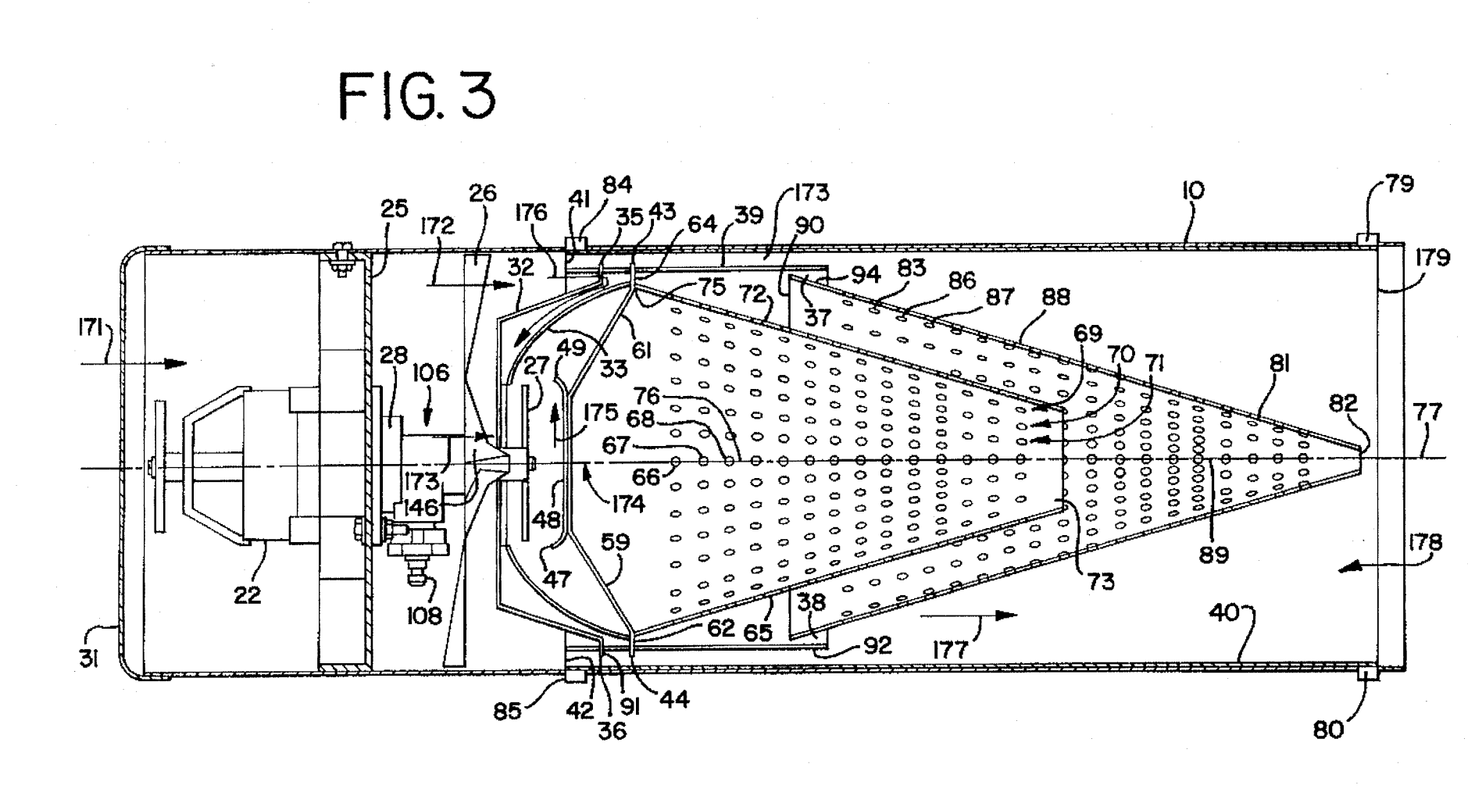
FIG. 3 is a side elevational view of the interior of portions of the heater depicted in FIG. 2.

As can also be seen in FIG. 3, the fuel atomizer 27 is surrounded by a rear head assembly which includes a rearward head 32 and a liner head 33. Rearward head 32 includes an opening 34 through which ignitor 17 extends. Mounting tabs 35 and 36, for example, of rearward head 32 are fastened to shield 39 at slots such as slot 96, for example. The widest, downstream portions of rear heads 32 and 33 are surrounded by a shield 39, which serves as a mounting platform for the rear heads 32 and 33 and which is itself secured to heater jacket 10 by means of tabs 41 and 42. The shield 39 includes an opening 46 which is aligned with the opening 34 to permit access of the ignitor to the region downstream of fuel atomizer 27. The liner head 33 includes mounting tabs 43 and 44 which are also affixed to shield 39 at slots such as slot 97, for example, and includes an opening 45 to permit insertion of the ignitor 17. The narrowest portions of both rear heads 32 and 33 are upstream of fuel atomizer 27.

Figure 9:
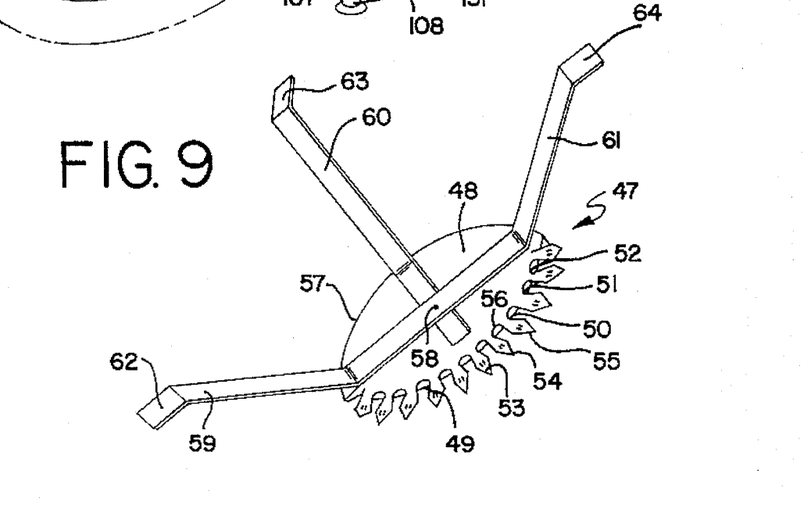
FIG. 9 is a perspective view of the serrated disc depicted in FIG. 2.

Immediately downstream of the fuel atomizer 27 is a serrated disc 47, which is best viewed in FIG. 9. The serrated disc 47 is formed as a substantially planar, circular sheet 48 having a serrated, upturned edge 49. The circular sheet 48 has a diameter of approximately three inches. Along the perimeter of the sheet 48 is a series of holes 50, 51 and 52, for example, each having a diameter of approximately 0.125 inch and having approximately one haft of their projected surface area overlying the circular sheet 48 and the other half of their projected surface area overlying the upturned edge 49. The area outside of the circular sheet 48, that is, the portion of the disc 47 which is part of the upturned edge 49, is formed as a series of substantially triangular, tooth like projections 53, 54 and 55, for example. One hole 56, for example, resides between each pair of adjacent teeth, such as teeth 54 and 55, for example. Since FIG. 9 is an isometric view, not all of the teeth are visible due to the inclination of edge 49, but it will be understood by those skilled in the art that the teeth 53, 54, 55, etc., extend around the entire perimeter 57 of disc 47. Extending from a central region 58 of disc 47 are four mounting arms (one being truncated for clarity in FIG. 9), including arms 59, 60 and 61, which terminate in mounting tabs 62, 63 and 64, respectively. Mounting tab 62 abuts tab 44 of liner head 33, while mounting tab 64 abuts mounting tab 43 of liner head 33.

The next downstream component housed within heater jacket 10 is the upstream circular perforated cone 65, which is, in a preferred embodiment, approximately seven inches in diameter at its base and approximately ten inches in length. The cone 65 terminates at end 73, which is approximately two inches in diameter. The centerline 76 of the cone 65 is collinear with centerline 77 of heater jacket 10. A multitude of holes 66, 67 and 68, for example, perforate the cone 65 in rows of fourteen holes per row, with each hole being approximately 0.1875 inch in diameter and being approximately equally spaced from adjacent holes. There are approximately twenty-six rows of holes laterally spaced about the cone, such as rows 69, 70 and 71, for example. The side 72 of cone 65 is inclined at approximately a 16° angle to the side of heater jacket 10. This angle, while dependent on the size of the combustion chamber, heater jacket and cones themselves, should not vary by more than a degree from the dimensions given here. The desirable effect of having the cone tapered at the proper angle is to cause the flame front to reside on the surface of the cone. A series of slots, such as slots 74 and 75, are used to secure the cone 65 to shield 39. Tabs 43 and 64 extend through slot 75, for example, the tabs 43 and 64 being affixed to the shield 39 which is itself affixed to heater jacket 10 by tabs 41 and 42, for example.

The final downstream component within heater jacket 10 is the downstream perforated cone 81. The downstream cone 81 is similar to first cone 65, with the noteworthy exception being that second cone 81 is approximately fourteen inches in length, and thus has an end 82 having a diameter of approximately 0.5 inch. Due to its increased length, downstream cone 81 has approximately eighteen holes 83, 86 and 87, for example, in each of its approximately twenty-six laterally spaced rows of holes. The side 88 of downstream cone 81 is substantially parallel to the side 72 of first cone 65. The centerline 89 of downstream cone 81 is collinear with centerline 77 of heater jacket 10. The base 90 of second cone 81 is displaced along centerline 77 of heater jacket 10 approximately four inches from the base 91 of first cone 65. Near the base 90 of downstream cone 81 are slots 92, 93 and 94, for example, which mate with appropriate tabs, such as tabs 38, 95 and 37, respectively, of the shield 39.

Figure 4:
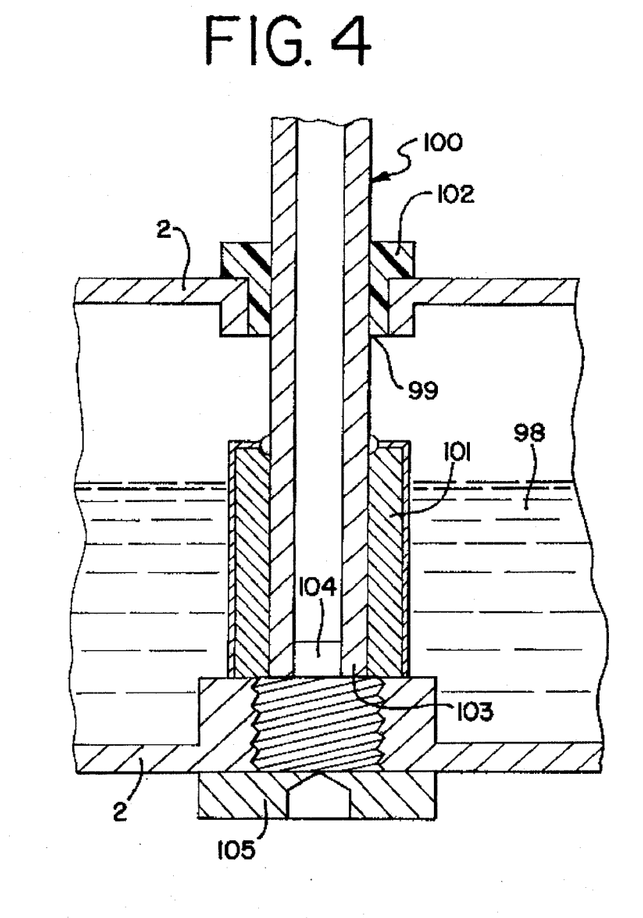
FIG. 4 is a sectional view of the fuel storage system of the heater depicted in FIG. 3.
Figure 5:
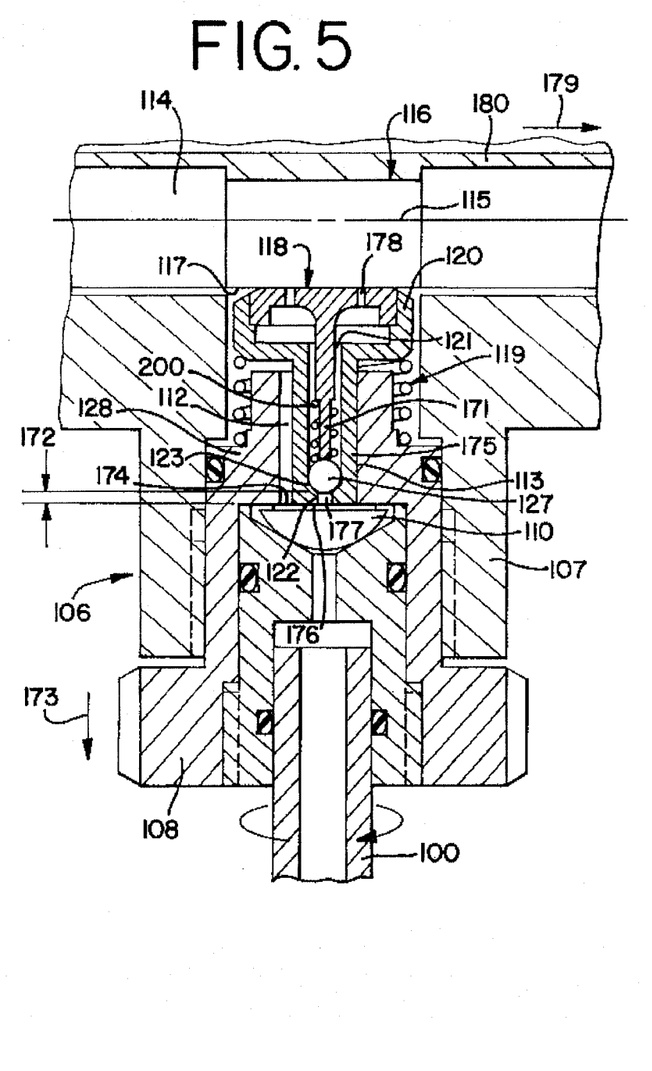
FIG. 5 is a sectional view of the fuel pump utilized in the heater depicted in FIG. 1.

Those skilled in the art will appreciate that the fuel atomizer 27 distributes fuel to the region of ignitor 17 in some fashion, and that a flame (not shown) is propagated downstream through perforated cones 65 and 81 by the action of fan 26. However, before describing the function of the aforementioned components in detail, one should first address the initial problem of delivering fuel from the tank 2 to the fuel atomizer 27. Referring particularly to FIGS. 2, 4 and 5, fuel 98 is seen to reside within tank 2. An orifice 99 formed within the top of tank 2 permits access to the fuel 98 by fuel pickup tube 100. The pickup tube 100 is formed to have a peripheral filter 101 in order to strain particulate material and prevent it from reaching the fuel atomizer 27. A grommet 102 is inserted into and seals orifice 99. An opening 104 at the bottom end 103 of pickup robe 100 admits fuel 98 into the tube. The force of gravity acting on the fuel 98 pushes the fuel through filter 101. The bottom end 103 of pickup tube 100 is affixed to a plug 105 that is threadably inserted into the bottom of fuel tank 2. Fuel pickup tube 100 may be constructed of stainless steel or a stiff plastic material.

Pump assembly 106 is formed to include a plastic housing 107. The fuel pickup tube 100 is inserted into fitting 108, which is itself threadably inserted into the bottom of housing 107. Within fitting 108 is a rubber, spherical segment valve 110 which permits fuel flow in an upward direction (away from the fuel tank 2) and prevents flow in a downward direction (towards fuel tank 2). Assuming the heater 1 to be operational, initially air and then fuel travels upwardly through fuel pickup tube 100 for at least some period of time as will now be described.

Fuel pickup tube 100 joins the cylinder 175 within which piston 113 reciprocates. The motor 22 is operating, meaning that motor shaft 114 is turning at approximately 5000 to 9000 rpm within beating housing 28. A central region 115 of the shaft 114 residing within the pump assembly 106 is of variable diameter, having a cut out or reduced region 116. This shape causes the outer surface 117 of shaft 114 to behave like a cam, that is, cyclically displacing piston wear plate 118 downwardly when surface 117 is in contact (as shown in FIG. 5), and permitting wear plate 118 to move upwardly to fill the void of cutout 116 for the remainder of the shaft rotation cycle. Wear plate 118 is forced against shaft 114 by the action of biasing spring 119.

The operation of the pump assembly 106 is as follows. On the downstroke, that is, with surface 117 in contact with wear plate 118, the piston 113 is pressed downwardly by the force of wear plate 118 on piston upper region 120. Piston 113 has a hollow bore 121 which terminates in a metering orifice 122. The beating surface 123 surrounding the top of metering orifice 122 serves as a seat for steel valve 127. A spring 200 resides between steel valve 127 and wear plate stem 171, the spring 200 tending to seat the steel valve 127 during high speed (7000–9000 rpm) operation. The total travel of piston 113 is approximately 0.030 inch, and there is clearance between wear plate stem 171 and the sidewalls of hollow bore 121. The effective stroke 172 of piston 113 can be adjusted from its maximum of 0.030 inch to zero by turning fining 108 counterclockwise. As the fitting is withdrawn from housing 106, the entire cylinder wall 128 is moved downwardly in the direction of arrow 173, thereby exposing steps 174 at the bottom end of cylinder 175. The steps have the effect of widening the cylinder into bypass path 112, and the effective compression is reduced dramatically once the bottom end 176 of piston 113 rises above steps 174. When the fitting 108 is retracted (lowered) a distance of 0.030 inch, the bottom end 176 of piston 113 is reciprocating in a region that is entirely above the steps 174, and thus its effective stroke is zero.

Keeping in mind the foregoing structural description, the pump assembly 106 operates as follows. The outer surface 117 of the shaft 114 pushes piston 113 downwardly in the direction of arrow 173, thereby causing steel valve 127 which resides within the piston 113 to unseat (move upwardly away from valve seat 123) momentarily due to inertial forces. Fuel in the region 177 travels upwardly around the steel valve 127 and through the hollow bore 121 of piston 113. The fuel continues traveling upwardly around the wear plate stem 171 and through the ports 178 in the top of wear plate 118. This introduces fuel into the cam cavity 116. At speeds above approximately 5500 rpm, the cam cavity 116 collects the fuel and the wider shaft cross section ending at shaft surface 117 acts like a paddle or vane and pushes the fuel in the direction of arrow 179.

As the shaft surface 117 continues turning, the cavity 116 is turned towards wear plate 118, causing the piston 113 to travel upwardly due to the biasing force of spring 119. Again, since steel valve 127 resides within piston 113, upward movement of the piston 113 causes a relative downward movement of the steel valve 127 against valve seat 123. Rubber valve 110 unseats (moves upwardly) due to the partial vacuum created by the upward piston movement. Fuel then travels upwardly from tank 2 through the pickup tube 100 and around the rubber valve 110 into the region or cavity 177 directly beneath steel valve 127. The height of the cavity 177 increases as the piston 113 moves upwardly. The diameter of region 177 is approximately 0.055 inches, and it serves as a metering orifice. The distance between the bottom of steel valve 127 and the upper surface of rubber valve 110 is on the order of 0.040 inch. This small clearance results in rapid valve response during high speed operation. Also, rubber valve 110 is of relatively large area and low mass so as to further reduce valve response time.

Figure 12:
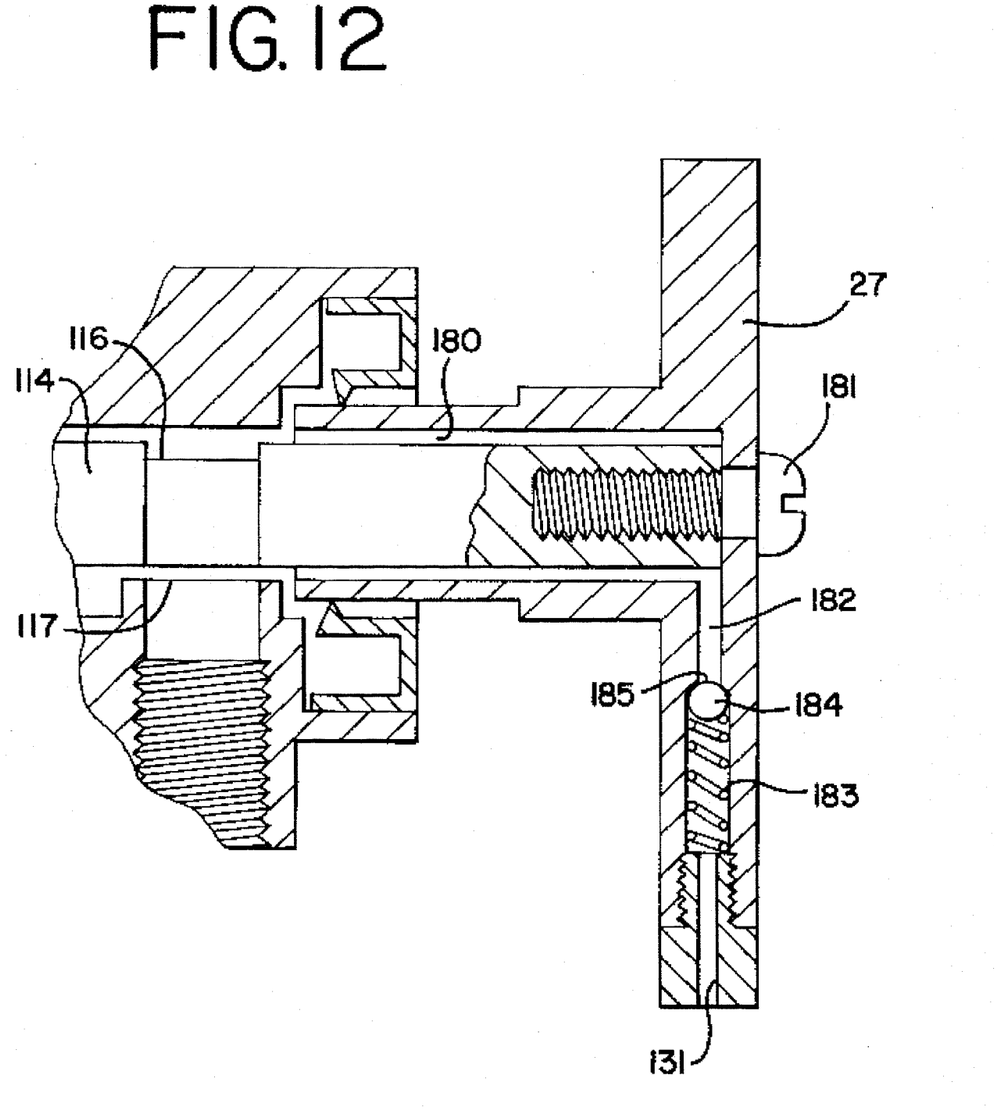
FIG. 12 is a sectional view of the atomizer utilized in the heater depicted in FIG. 1.

In the aforementioned manner the fuel is thus continuously pumped upwardly and into the jacket or lining 180 surrounding shaft 114, the fuel being urged in the direction of arrow 179. Referring now also to FIG. 12, the fuel is seen to travel through cavity 180 to atomizer 27, which is rigidly attached to shaft 114 by screw 181. The atomizer includes two hollow shafts 182 which leads to fuel outlets 131. A spring 183 within cavity 182 biases a ball valve 184 against seat 185 when the atomizer 27 is not spinning. When the motor shaft 114 is rotating at speeds above approximately 6000 rpm, the fuel and air inside the tubes 182 is thrown outwardly by centrifugal force, resulting in a pressure reduction which draws fuel from the cam area 116.

In summary, three discrete pumping actions actually take place. First, the piston 113 displaces fuel. Second, the cam 116 in combination with the piston pump 106 acts as a vane pump or journal beating to force the fuel toward atomizer 27. Finally, the centrifugal effect of the atomizer tubes 182 pumps fuel at speeds above 6000 rpm.

Figure 6:
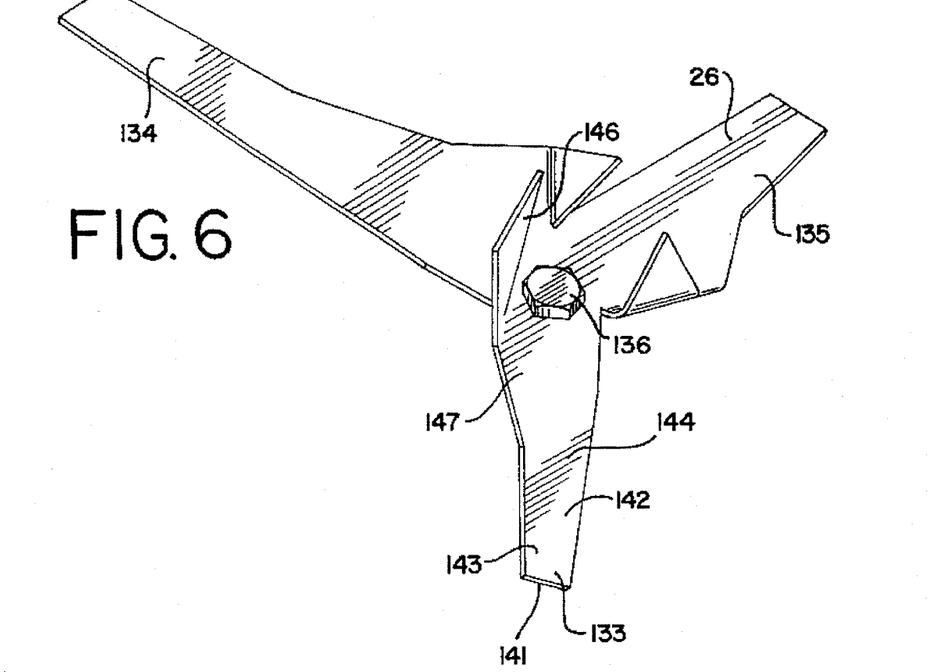
FIG. 6 is a perspective view of the fan blade of the heater depicted in FIG. 1.
Figure 7:
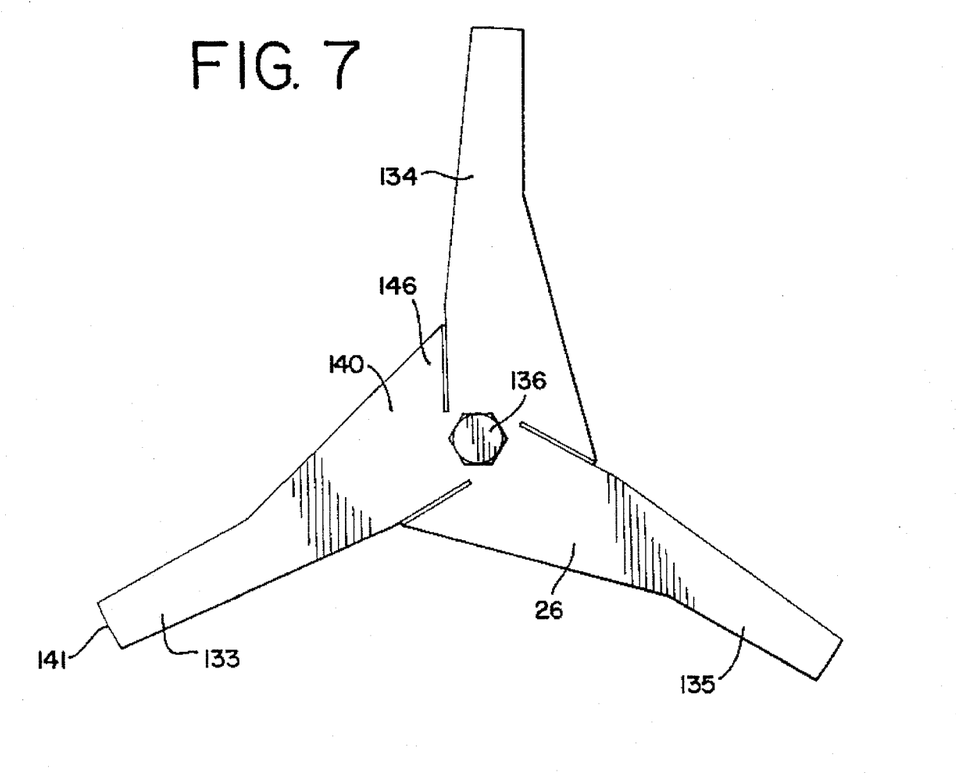
FIG. 7 is a front elevational view of the fan blade depicted in FIG. 6.
Figure 8:
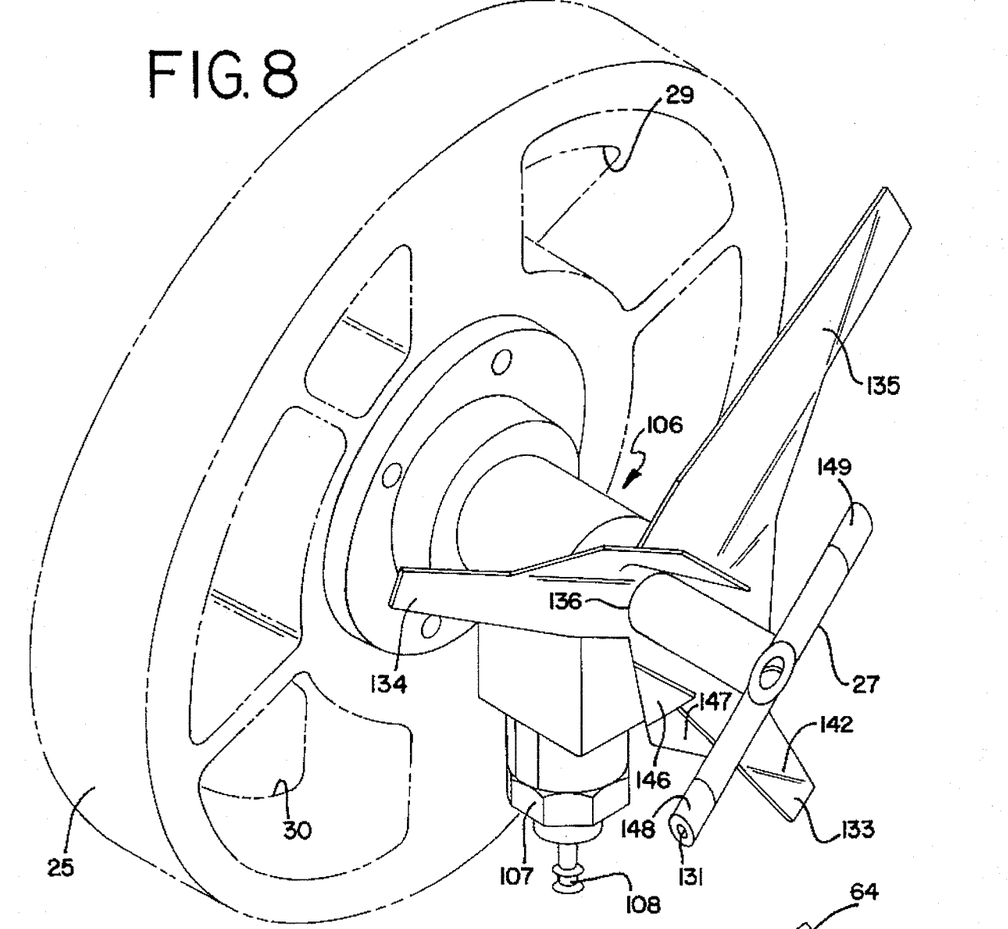
FIG. 8 is a perspective view of the fan blade depicted in FIG. 7, shown in its operative relationship to the motor and fuel delivery system.

Referring also to FIGS. 6, 7 and 8, the function and design of the fan 26 as used in the heater 1 will now be discussed. The fan 26 is formed of a lightweight, relatively stiff material such as aluminum or certain plastics and ceramics. The fan 26 includes three blades 133, 134 and 135, each spaced apart from the adjacent blade by an angular displacement of 120°. The blade has a central mounting hub 136 which is attached to the atomizer 27 by means of a hex shaped hub retained by a snap ring (not shown) in a manner well known in the art. Each of the blades is substantially identical in shape and size, and so only one will be discussed here in detail. Blade 133 is formed to include a relatively wide base portion 140 which tapers to terminate at the relatively narrower, blunt tip 141. The width of tip 141 is approximately 0.42 inch. The tip 141 is bent or twisted slightly along line 142, causing the outer blade portion 143 to be inclined slightly with respect to the surface 144 of blade 133. The angle between the blade portion 143 and the plane in which surface reside is approximately ten degrees. Thus, the "pitch" of the outer blade portion 143 of blade 133 is approximately ten degrees, which is a relative flat or "fine" pitch, thereby promoting axial flow of air parallel to the axis 145 of shaft 114. The base portion 140 of blade 133 is formed to include a substantially triangular vane 146 which is inclined at approximately ninety degrees from the plane in which blade surface 144 resides. Vane 146 is thus very steeply pitched, resulting in an outward flow in the region of hub 136 and radially outward from shaft 114 and its axis 145. The exaggerated blade pitch results in forward axial flow into the center of the combustion chamber, which is necessary in order to prevent the tendency toward reverse axial flow near the fan hub. The latter condition must be avoided since it would tend to draw the flame rearwardly. Finally, a transitional region 147 of blade 133 joins surface 144 and vane 146. The pitch of region 147 is approximately thirty degrees with respect to the plane in which surface 144 resides. This results in a region of intermediate pitch and relatively turbulent flow in the region immediately surrounding the tips 148 and 149 of atomizer 27.

Figure 10:
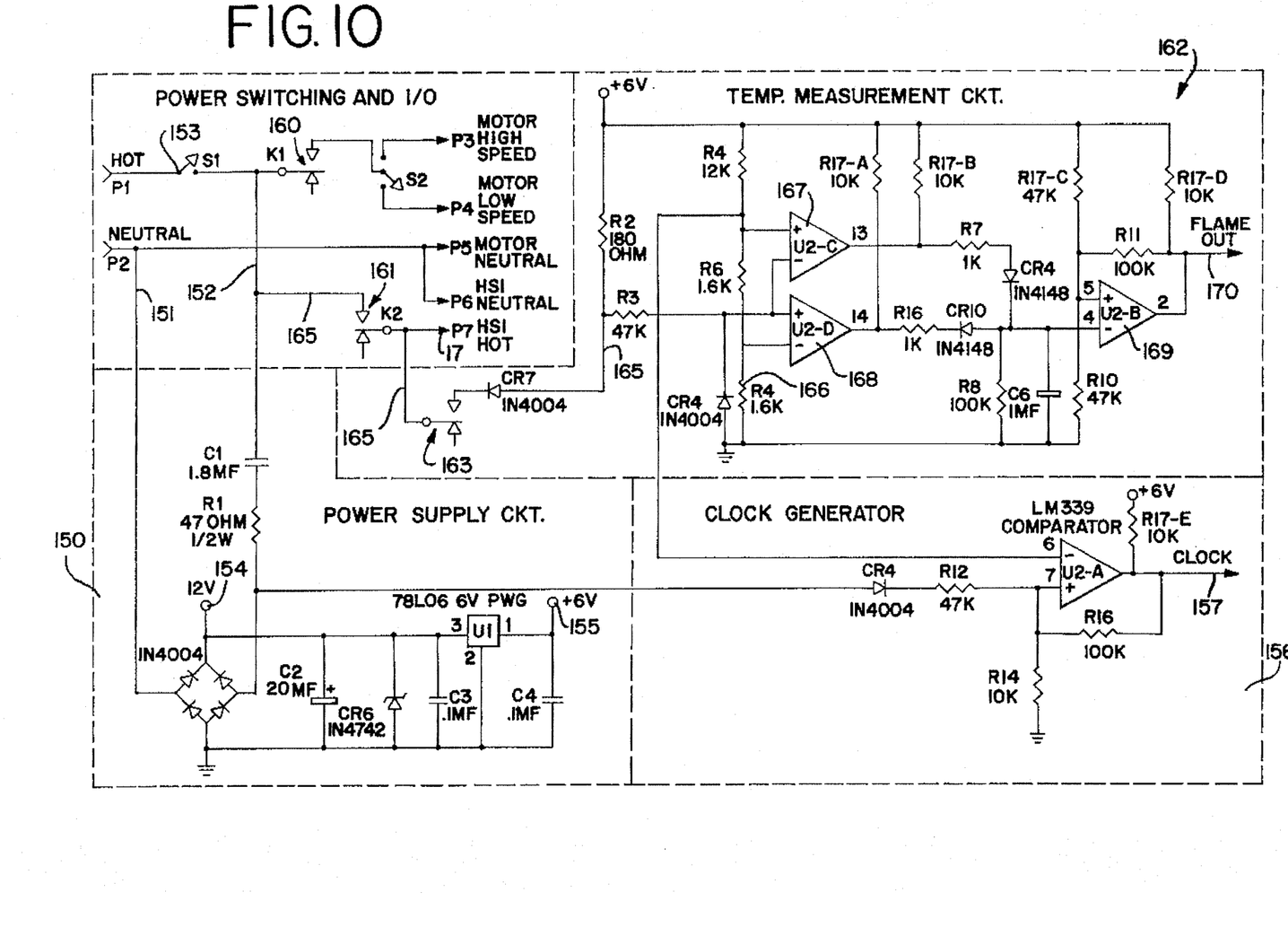
FIG. 10 is a schematic diagram of the power supply and temperature measuring circuitry used in conjunction with the heater depicted in FIG. 1.
Figure 11:
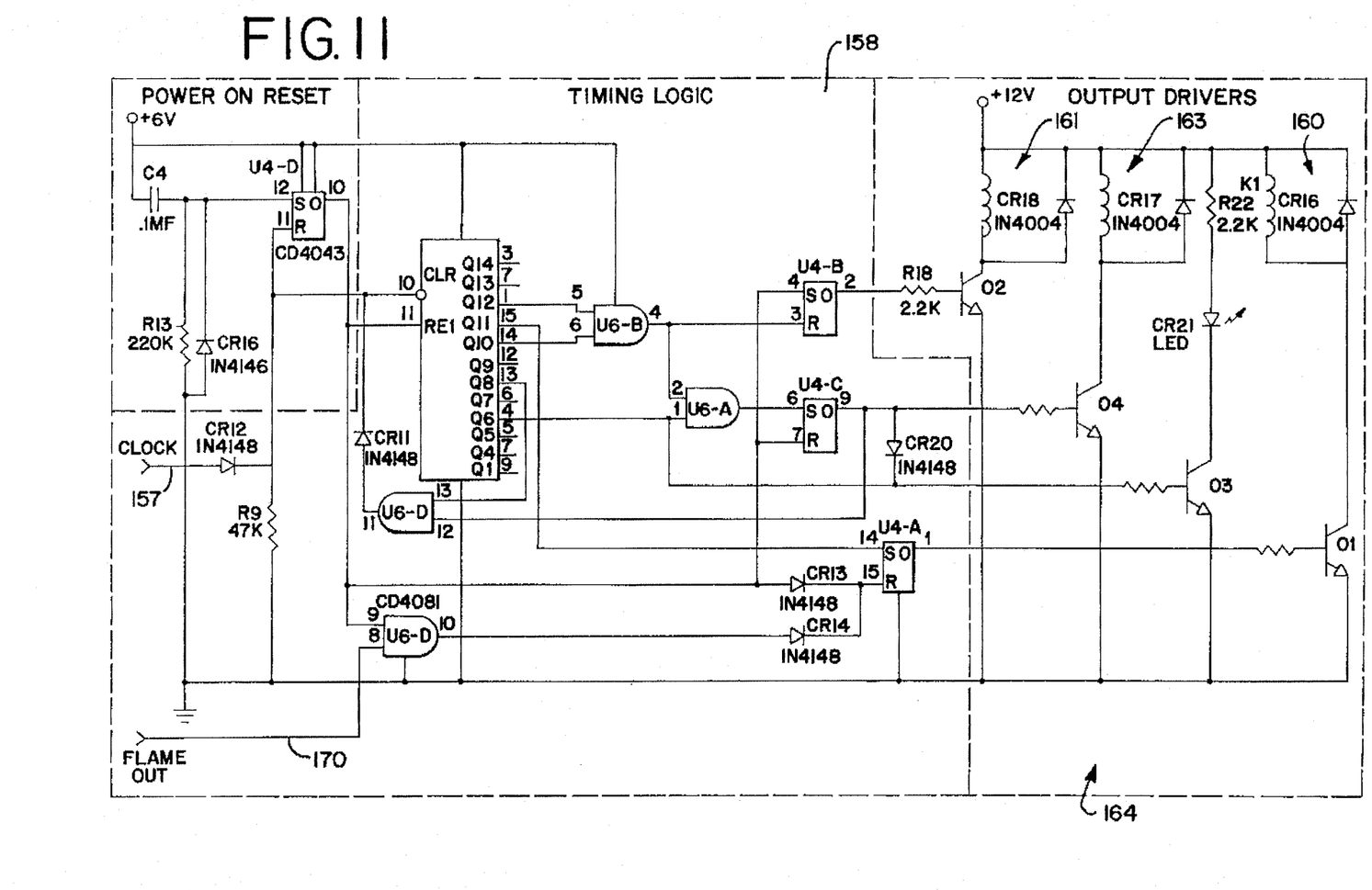
FIG. 11 is a schematic diagram of the timing logic and output circuitry used in conjunction with the heater of FIG. 1.

The final major subassembly essential to the operation of theater 1 is the power supply and control circuitry depicted in FIGS. 10 and 11. The power supply 150 is connected to a source of 120 volt alternating current through leads 151 and 152. Switch 153 turns the power supply on. A bridge rectifier produces an unregulated 12 volt source at terminal 154, and a regulated 5 volt source at terminal 155. When switch 153 is closed, power is applied to the hot surface ignitor 17. A clock circuit 156 is energized which delivers periodic timing pulses to a clock output lead 157. The clock pulses are delivered to timing circuit 158 where various timing sequences are created. For example, after the switch 153 is closed, the timing circuit 158 begins and initial fifteen second count, after which time the motor output 160 is turned on, activating motor 22 and permitting the formation of a flame (not shown). This fifteen second delay permits the hot surface ignitor 17 to reach a temperature sufficient to ignite the fuel 98 prior to the application of fuel to the pump assembly 106, atomizer 27 and ultimately to the ignitor 17 itself. After an approximate delay of thirty seconds, timing circuit 158 turns hot surface ignitor 17 off via relay 161.

Approximately one second after the hot surface ignitor 17 is turned off, the temperature measurement circuit 162 is turned on via relay 163. The theory underlying the operation of temperature measurement circuit 162 is based on the fact that the materials used in forming the hot surface ignitor 17 change electrical resistance values in response to changes in temperature. The resistance of ignitor 17 decreases with increasing temperature. After turning ignitor 17 on and establishing a flame, the ignitor 17 is turned off as just described and the resistance of the ignitor 17 is monitored. In order for the ignitor 17 to be an indicator of temperature, the ignitor 17 must be located in or near the heater flame downstream of atomizer 27 to insure that the ignitor 17 remains well above the ambient temperature when the flame is present. The ignitor 17 must also be mounted within the air flow downstream of atomizer 27 to insure that the ignitor 17 will cool rapidly in the event that the flame goes out. When the resistance of ignitor 17 reaches some predetermined level, the measurement circuit 162 will send a signal to output circuit 164 to turn the motor 22 off, thereby insuring that fuel 98 is not delivered to the atomizer 27 when the flame is not lit.

Thus, the "temperature" measurement circuit 162 determines if the heater 1 is running properly (that is, a flame is present) by measuring the electrical resistance of the hot surface ignitor 17. Due to the configuration of the power supply circuit 150, the resistance measurements are made based on the half wave signal applied to the ignitor 17 along signal path 165. If the resistance of the ignitor 17 is higher than the predetermined level set by resistor 166, the ignitor 17 has either failed or has cooled to a level indicating that the flame is not present. Measurement circuit 162 also monitors for open or short circuit conditions involving ignitor 17 by measuring relative currents at the terminals of integrated circuits 167 and 168, which are elements of an LM 339 comparator. If the flame is not present or the ignitor 17 has malfunctioned, integrated circuit 169 (also part of the LM 339 comparator) turns the heater 1 off by sending a signal along signal path 170, thereby deenergizing relay 160.

Keeping in mind the operation and characteristics of the specific systems already described, the general operation of the heater 1, with emphasis on the air flow patterns, will now be discussed in detail with primary reference to FIG. 3. Assuming the heater 1 to already be in operation, atmospheric air at ambient temperature enters heater jacket 10 along path 171 through grate 31. The air continues past motor 22, which it helps cool, and encounters rotating fan 26, where the air takes one of two distinct paths. Approximately eighty percent of the air entering grate 31 encounters the low pitched, outer portions of fan 26, thereby following path 172. The shape of rear head 32 tends to deflect the air along path 172, thereby forcing the air into the space 173 between shield 39 and shield 40 and into the space between shield 40 and heater jacket 10. Insofar as the heater 1 is in operation and generating heat, the air following path 172 tends to cool the heater jacket 10. Approximately twenty percent of the air entering grate 31 encounters the high pitched vanes 146 near the hub of the fan 26, which causes the air to follow the path 173 through the opening at the mouths of the rear heads 32 and 33, thus encountering atomizer 27. Air following path 176 is relatively slow moving and therefore helps support ignition.

Once the air passes atomizer 27, it directly impinges serrated plate 47, causing some of the air to assume a path generally indicated by arrow 175. Once the air reaches the serrated edge 49 (see FIG. 9), a relatively high degree of turbulence exists in the region 176 between the atomizer 27 and the disc 47. Some of the air along path 175 is swept around the edge 49 of disc 47 to pass through the region 174, thereby supporting combustion around the ignitor 17. Some of the air along path 175 encounters rear head 33, which is at an elevated temperature since it extends past serrated disc 47, thereby causing the air along path 176 to be heated and directed to the region surrounding atomizer 27, further supporting atomization and tending to preheat the atomized fuel air mixture before it encounters ignitor 17 and its associated flame. As cooling air rushes along path 172, it continues past upstream cone 65 and downstream cone 81 along path 177, which creates a relatively low pressure area along the sidewalls 72 and 88 of the cones, thereby urging or drawing the flame toward the tapered tip 82 of the downstream cone 81. The air in the region 178 within heater jacket 10 is thereby heated and expelled through the open end 179 of heater 1.

In general, the effect of the cones 65 and 81 is to promote atomization and discourage dynamic grouping along the atomized fuel flow path. In other words, the atomized fuel leaving atomizer 27 has a tendency, when propelled downstream by the fan 26, to allow a helical path. This results in bands or lines of atomized fuel which are distributed along this helical path. The effect of each cone is to intercept the helical path and disrupt it, destroying its orderly arrangement of fuel particles which could lead to a pulsating or nonuniform flame. The atomized fuel is forced through the many perforations in each cone 65 and 81, the effect being to greatly subdivide any groupings of atomized fuel. As the fuel passes from the interior to the exterior of the cone via the many perforations, the fuel is ignited at the cone surface as the previously over rich fuel/air mixture is suddenly leaned by the physical disrupting or subdividing process.

Having thus described the preferred embodiment of the invention it should be understood that numerous structural modifications and adaptations may be made without departing from the spirit and scope of the invention as set forth in the following claims.

We claim:

1. A portable heater comprising:
   (a) a combustion chamber comprising:
      (i) a downstream conical element having an inlet, an exhaust outlet and at least one perforation;
      (ii) an upstream conical element having an inlet, an exhaust outlet and at least one perforation, with said upstream conical element having an axis of rotation generally coaxial with the axis of rotation of said downstream conical element;

(b) a combustion chamber head comprising:
  (i) a mounting base for operatively supporting said upstream conical element, with said mounting base further comprising an aperture, with said aperture being centered generally about the axes of rotation of said upstream and downstream conical elements and located in proximity to the inlet of the upstream conical element; and
  (ii) a disc with at least one serration about the periphery of the disc, said disc being positioned between said aperture and said inlet of said upstream conical element, said disc being positioned generally coaxially with the axes of rotation of said aperture and said conical elements;

(c) a generally cylindrical heat shield surrounding at least one of said conical elements and having an axis of rotation generally coaxial with the axes of rotation of said upstream and downstream conical elements;

(d) a prime mover having an output shaft, said shaft positioned generally coaxially with the axes of rotation of said upstream and inner downstream conical elements;

(e) means for delivering a combustible fluid to said combustion chamber;

(f) means for igniting the combustible fluid; and (g) an air delivery system comprising an axial displacement fan mounted on said output shaft of said prime mover, said fan comprising a first, inner portion for delivering air to said combustion chamber through said aperture and said inlet of said upstream conical element, and a second, outer portion for delivering air to an area between said conical elements and said heat shield, wherein said means for delivering a combustible fluid to said combustion chamber draws the combustible fluid from a reservoir and conveys the combustible fluid to said combustion chamber and wherein said means for igniting the combustible fluid is activated upon start up of the heater and wherein said air delivery system conveys air for combustion through both said apertures in the combustion chamber head and an area between the conical elements and said heat shield and wherein the combustible fluid is burned within said combustion chamber so that the combustion process is substantially completed within said combustion chamber.

2. The heater of claim 1, wherein said upstream and downstream conical elements are in a nesting relationship.

3. The heater of claim 2, wherein said output shaft of said prime mover further comprises a cam.

4. The heater of claim 3, wherein said means for delivering combustible fluid to the combustion chamber further comprises:
  (a) a pump driven by said cam;
  (b) an atomizer mounted at one end of said output shaft of said prime mover, said atomizer projecting into said combustion chamber head through said aperture and wherein said atomizer is positioned between said disc and said aperture; and
  (c) a gallery within said output shaft of prime mover for conveying combustible fluid from said pump to said atomizer.

5. The heater of claim 4, wherein the cross sectional area of said inlets of said conical elements are larger than the cross sectional areas of said outlets of said conical elements.

6. The heater of claim 5, wherein said means for igniting the combustible fluid comprises:
  (a) an electric resistance hot surface igniting element; and
  (b) an electrical control circuit for selectively energizing said igniting element.

7. The heater of claim 6, further comprising a detection system for stopping delivery of the combustible fluid to said combustion chamber in the event that the combustion process terminates.

8. The heater of claim 7, wherein said pump further comprises a piston, said piston having a hollow bore to permit passage of the combustible fluid through said piston.

9. The heater of claim 8, wherein said pump comprises first and second check valves, said second check valve being biased into a closed position when the piston begins its downward travel.

10. The heater of claim 9, wherein the serrated disc is formed to include an edge, the edge being scalloped by a series of semicircular indentations, and a toothed projection extending radially outward from between each pair of adjacent semicircular indentations.

11. A portable heater comprising:
(a) a downstream perforated conical element;
(b) an upstream perforated conical element mounted at least partially within said downstream perforated conical element and having an axis of rotation generally coaxial with the axis of rotation of said downstream perforated conical element;
(c) a combustion chamber comprising:
  (i) a mounting base for said upstream and downstream perforated conical elements, the mounting base including a fresh air inlet opening, said fresh air inlet opening being centered generally about said axes of rotation of said upstream and downstream perforated conical elements;
  (ii) a disc, said disc being positioned between the fresh air inlet opening and the apexes of the conical elements and having a serrated periphery;
(d) a generally cylindrical heat shield surrounding at least one of said perforated conical elements and having an axis of rotation generally coaxial with said axes of rotation of said perforated conical elements;
(e) a motor, the motor having an output shaft, said shaft being positioned generally coaxially with the axes of rotation of said outer and inner perforated conical elements;
(f) means for delivering a combustible fluid to said combustion chamber;
(g) means for igniting the combustible fluid; and
(h) an air delivery system comprising an axial displacement fan mounted on said motor output shaft, said fan comprising an inner portion for delivering air to said combustion chamber through said fresh air inlet opening, and an outer portion for delivering air to an area between said perforated conical elements and said heat shield, wherein the means for delivering the combustible fluid to the combustion chamber draws the combustible fluid from a reservoir and delivers the combustible fluid in an atomized state to said combustion chamber and wherein said means for igniting the combustible fluid is activated upon start up of the heater and wherein said air delivery system delivers air for combustion through both said fresh air inlet opening in said combustion chamber and to an area between said perforated conical elements and said heat shield, wherein the combustible fluid is burned within said combustion chamber so that the combustion process is substantially completed before the fuel is expelled from said combustion chamber.

12. The heater of claim 11, wherein the serrated disc is positioned generally coaxially with said axes of rotation of said combustion chamber fresh air inlet opening and said conical elements.

13. The heater of claim 12, wherein said output shaft is formed so as to have a region of varying diameter.

14. The heater of claim 13, wherein said means for delivering the combustible fluid to said combustion chamber comprises:

(a) a piston pump driven by said region of varying diameter on said motor output shaft;

(b) an atomizer mounted at the end of said motor output shaft, said atomizer projecting into said combustion chamber head through said fresh air inlet opening; and (c) a gallery within said motor output shaft and in fluid communication with said pump and said atomizer for conveying the combustible fluid from said pump to said atomizer.

15. The heater of claim 14, wherein said atomizer is positioned between said disc with the serrated periphery and said fresh air inlet opening.

16. The heater of claim 15, wherein said means for igniting the combustible fluid comprises an electric resistance hot surface igniting element, said igniting element being mounted so as to be within the flow of air generated by said axial displacement fan so as to cool rapidly in the absence of a flame.

17. The heater of claim 16, further comprising an electrical control circuit, said electrical control circuit inhibiting operation of the motor until said igniting element has reached a temperature sufficient to initiate combustion within the combustion chamber.

18. The heater of claim 17, wherein said control circuit detects changes in temperature within said combustion chamber by measuring the electrical resistance of said hot surface ignitor, said control circuit inhibiting operation of said motor when the resistance exceeds a threshold value.

19. The heater of claim 18, wherein said igniting element is turned off after combustion is initiated.

* * * * *